March 17, 1936.   W. BROWN   2,034,650

GOODYEAR WELT

Filed April 20, 1934

INVENTOR
William Brown
BY
Augustus B. Stoughton
ATTORNEY.

WITNESS:
Robt R Mitchell.

Patented Mar. 17, 1936

2,034,650

UNITED STATES PATENT OFFICE 2,034,650

GOODYEAR WELT

William Brown, Quakertown, Pa., assignor to McAdoo & Allen Welting Company, Quakertown, Pa., a partnership consisting of Henry M. McAdoo, William McAdoo, Jr., and George H. Allen Application April 20, 1934, Serial No. 721,523

2 Claims. (Cl. 36—78)

In the manufacture of light sole shoes, such as are worn by ladies, it is desirable to incorporate in the finished article a very thin Goodyear welt. However, a Goodyear welt of the thinness described and desired is too flimsy to go properly through the machine guides.

It is the object of the present invention to overcome the above mentioned defects and to attain the above mentioned advantage.

According to the present invention this is accomplished by the provision of a composite Goodyear welt comprising two superposed strips separably connected together and of which one is provided with a stitch groove on its exposed face, the composite strip or welt being stiff enough to pass through machine guides and the grooved strip being removable after the upper has been sewed on and for that purpose consisting of appropriate material.

The invention also comprises the improvements to be presently described and finally claimed.

Figure 1:
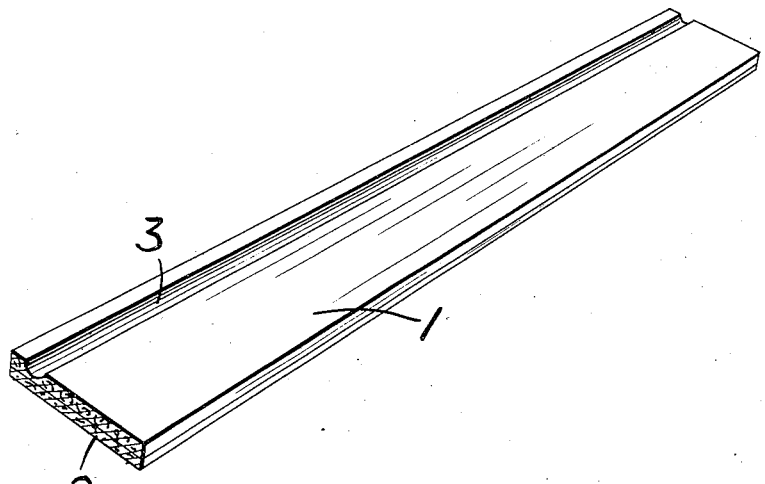
Figure 2:
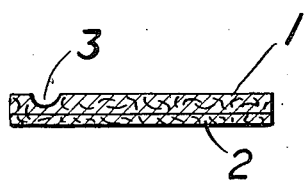

In the following description reference will be made to the accompanying drawing forming part hereof and in which, Figure 1 is a perspective view of a composite welt embodying features of the invention, and Figure 2 is a transverse sectional view of the same.

Referring to the drawing, 1 and 2 indicate superposed strips of substantially the same width and they are connected together as by means of paste in such a way that one of them can be torn off. The strip 1 is provided with a stitch groove 3 on its exposed face. The strip 1, since its function is to add sufficient stiffness to the welt to permit the same to pass through machine guides and since it is dispensed with or torn off after the upper is sewed on, may be of a variety of materials, such as leather, paper or fabric. The strip 2, since it remains in the finished shoe, may be of leather with its grain side outermost in the welt. After the upper has been sewed on the strip 1 is torn off leaving the strip 2 to constitute the welt.

I claim:

1. For light sole shoes a Goodyear welt of generally rectangular form in cross-section comprising two superposed strips separably connected together and of which one is provided with a stitch groove on its exposed face and of which the other retains its grain side intact, said composite welt possessed at the inseam of the strength of regular welt and being stiff enough to pass through machine guides, and said grooved strip being removable by tearing after the upper has been sewed on.

2. A process of applying very thin Goodyear welts to shoes, which process consists in, passing through the guides of shoe-making machines a composite welt formed of two superposed strips, one of said strips being too flimsy to go properly through the machine guides, and said other of said strips serving to reinforce said first-mentioned strip, sewing an upper onto said composite welt, and tearing off said second-mentioned strip, leaving a thin Goodyear welt formed by said first mentioned strip.

WILLIAM BROWN.